United States Patent
Nakajima et al.

(10) Patent No.: US 6,177,479 B1
(45) Date of Patent: Jan. 23, 2001

(54) CONTINUOUS MANUFACTURING METHOD FOR MICROSPHERES AND APPARATUS

(75) Inventors: Mitsutoshi Nakajima; Yuji Kikuchi; Yoh Sano; Hiroshi Nabetani, all of Ibaraki; Takahiro Kawakatsu, Miyagi; Isao Kobayashi, Gunma; Hironoshin Takao, Saitama, all of (JP)

(73) Assignees: Japan as represented by Director of National Food Research Institute, Ministry of Agriculture, Forestry and Fisheries, Ibaraki; Bio-oriented Technology Research Advancement Institution, Tokyo, both of (JP)

( * ) Notice: Under 35 U.S.C. 154(b), the term of this patent shall be extended for 0 days.

(21) Appl. No.: 09/260,412

(22) Filed: Mar. 1, 1999

(30) Foreign Application Priority Data

Mar. 30, 1998 (JP) .................................................. 10-083946

(51) Int. Cl.[7] .................. B01F 3/08; B01F 5/06; B01F 17/34

(52) U.S. Cl. ..................... 516/73; 264/11; 366/173.1; 366/176.1; 366/176.4; 514/937; 514/941; 516/924

(58) Field of Search .................. 516/73, 924; 366/173.1, 366/176.1, 176.4, 340, 341; 210/800; 137/7; 514/937, 941; 264/11

(56) References Cited

U.S. PATENT DOCUMENTS

| | | | |
|---|---|---|---|
| 3,747,759 | * 7/1973 | Olgard et al. | 210/800 |
| 4,201,691 | * 5/1980 | Asher et al. | 516/924 X |
| 4,533,254 | * 8/1985 | Cook et al. | 366/176.1 |
| 5,326,484 | * 7/1994 | Nakashima et al. | 366/340 X |
| 5,842,787 | * 12/1998 | Kopf-Sill et al. | 366/340 |
| 5,904,424 | * 5/1999 | Schwesinger et al. | 366/340 X |

FOREIGN PATENT DOCUMENTS

| | | |
|---|---|---|
| 54116389 | 9/1979 | (JP) . |
| 605223 | 1/1985 | (JP) . |
| 295433 | 4/1990 | (JP) . |
| 5220382 | 8/1993 | (JP) . |
| 6071150 | 3/1994 | (JP) . |
| 6315617 | 11/1994 | (JP) . |
| WO97/30783 | 8/1997 | (WO) . |

OTHER PUBLICATIONS

E.S.R. Gopal, "Science Of Emulsions", Asakura–shoten 1971.

F. Olson et al., "Preparation Of Liposomes Of Defined Size Distribution By Extrusion Through Polycarbonate Membranes", *Biochimica et Biophysica Acta*, 557 (1979) 9–23, Elsevier/North–Holland Biomedical Press.

"KAGAKU KOGAKU", vol. 21, No. 4, 1957.

(List continued on next page.)

Primary Examiner—Richard D. Lovering
(74) Attorney, Agent, or Firm—Carrier, Blackman & Associates, P.C.; Joseph P. Carrier; William D. Blackman

(57) ABSTRACT

In an apparatus for continuously manufacturing microspheres, a dispersed phase (O) is supplied to a chamber 27 for the dispersed phase inside of a bulkhead member 26 via a supply port 23. Thereafter, the dispersed phase enters into a gap 31 between a plate 22 via a supply port 29 in a base 25. The dispersed phase which enters into the gap 31 grows microspheres (particles) having a certain diameter while passing through a microchannel 33 by pressure applied by, for example, a pump, and is mixed with a continuous phase (W), so that microspheres are produced. The thus-produced microspheres float or are suspended in the continuous phase without needing any particular external force in response to their specific gravity, allowing the microspheres to be generated and withdrawn from a withdrawal port 32 at a significantly reduced pressure in comparison to conventional methods and apparatus.

15 Claims, 11 Drawing Sheets

OTHER PUBLICATIONS

"Method Of Using Repeated Filtrations Through A PTFE Membrane", Proceedings of the 26th Autumn Meeting of the Society of Chemical Engineers, p. 243, 1993.

T. Kawakatsu et al. "Regular–Sized Cell Creation In Microchannel Emulsification By Visual Microprocessing Method", JAOCS, vol. 74, No. 3(1997) pp. 317–321.

* cited by examiner (a)

(b)

(a)

(b)

(a)

(b)

(a)

(b)

(a)

(b)

(a)

(b)

CONTINUOUS MANUFACTURING METHOD FOR MICROSPHERES AND APPARATUS

BACKGROUND OF THE INVENTION

1. Field of the Invention

The present invention relates to a manufacturing method for microspheres (including emulsions and fine particles suspended in liquid) used in the food industry, the manufacturing of drugs and cosmetics, etc., and to an apparatus for carrying out the method.

2. Description of Related Art

Techniques in which a biphasic system, for which a separated state is thermodynamically stable, is formed, such as that composed of a water phase and an organic phase which are emulsified to obtain a semi-stable emulsion, are conventionally known. As general, well-known emulsification methods, there have been described in "Science of Emulsions" (Asakura-shoten, 1971), the methods of using a mixer, a colloid mill, a homogenizer, etc., and the method of dispersion with sound waves.

The general methods mentioned above have a disadvantage in that the diameters of dispersed phase particles in a continuous phase are distributed over a wide range.

Therefore, a method of using filtration by means of a membrane comprising polycarbonate (Biochemica et Biophysica Acta, 557 (1979), North Holland Biochemical Press); a method using repeated filtrations through a PTFE (polytetrafluoroethylene) membrane (Proceedings of the 26th Autumn Meeting of the Society of Chemical Engineers, Japan, 1993); and, a method of manufacturing homogenous emulsions by transferring a dispersed phase into a continuous phase through a porous glass membrane having uniform pores (Japanese Patent Application Laid-Open Nos. 2-95433, 5-220382 and 6-315617), have been proposed.

In addition, a method of manufacturing emulsions via fine pores formed in a membrane filter with a dry etching process or a wet etching process has been proposed in Japanese Patent Application Laid-Open No. 6-71150, a method of manufacturing emulsions by transferring a dispersed phase into a continuous phase through a nozzle has been proposed in Japanese Patent Application Laid-Open No. 60-5223, and a method of producing emulsions using a porous plate has been proposed in Japanese Patent Application Laid-Open No. 54-116389. In addition, a laminar-flow dripping method (KAGAKU KOOGAKU Vol. 21, No. 4, 1957) is also known.

Furthermore, a method of producing emulsions by transferring a dispersed phase into a continuous phase through microchannels having a predetermined width has been proposed (JAOCS, 74, 1997, pp. 317–321).

The method using filtration through a membrane comprising polycarbonate and the method using repeated filtrations through a PTFE membrane theoretically cannot manufacture emulsions comprising particles larger than the membrane pores and cannot separate particles smaller than the membrane pores. These methods are, therefore, especially unsuitable for producing emulsions comprising large particles.

In the method using a porous glass membrane having uniform pores, when the average diameter of the membrane pores is small, particle diameters are distributed in a narrow range and thus homogenous emulsions can be obtained. When the average diameter of the membrane pores is increased, however, particle diameters become distributed over a wide range so that homogenous emulsions cannot be obtained. In addition, in the laminar-flow dripping method using a nozzle or a porous plate, particle sizes become 1,000 μm or more and are distributed over a wide range so that homogenous emulsions cannot be obtained.

In the method using microchannels having a predetermined width described in—JAOCS, 74, 1997, pp. 317–321—, homogenous emulsions can be obtained. However, as the method is a batch-type method, emulsions cannot be continuously produced. When the diameter of the channels is increased, the size of produced emulsions becomes large, and the emulsions cannot travel and unite with each other, so that homogenous emulsions cannot be obtained.

Therefore, the inventors of the present invention formerly proposed an apparatus which can continuously produce homogenous emulsions in International Publication No. WO97/30783.

The structure of this apparatus is shown in FIG. 14. In this apparatus for producing emulsions, a supply port 101 for a continuous phase (W) is formed in a side wall of a body 100, a supply port 103 for a dispersed phase (O) is formed in the center of a lid 102 which closes an upper opening of the body 100, and one or more withdrawal ports 104 for emulsions (E) are formed at a place apart from the center. A bulkhead member 106 formed between the lid 102 and a base 105 separates the supply port 103 for the dispersed phase (O) from the withdrawal ports 104 for emulsions (E). In addition, a supply port 107 for the dispersed phase (O) is formed in the center part of the base 105, a gap 109 is formed between the base 105 and a plate 108 placed opposite the base 105. In a boundary section 110 formed in the base 105 the dispersed phase (O) and the continuous phase (W) are separated, and, in a microchannel 111 formed in the boundary section 110, the dispersed phase (O) and the continuous phase (W) are mixed.

The dispersed phase (O) supplied to the inside of the bulkhead member 106 via the supply port 103 enters the gap 109 between the plate 108 and the base 105 via the supply port 107 and this dispersed phase (O) enters the continuous phase (W) through the boundary section 110, thereby forming emulsions.

With the above-mentioned apparatus, homogenous emulsions can be continuously obtained. However, it is necessary to supply power in order to withdraw emulsions and there is room for improvement with respect to the cost.

SUMMARY OF THE INVENTION

To solve the above-mentioned problems, there is provided in accordance with the present invention a method for continuously manufacturing microspheres comprising the steps of: transferring a pressurized dispersed phase into a continuous phase by force via a plurality of microchannels having a predetermined width to produce emulsions and withdrawing microspheres in the form of produced emulsions and fine particles suspended in liquid, etc., with the microspheres floating and sinking in response to their specific gravity.

There is also provided in accordance with the present invention an apparatus for continuously manufacturing microspheres comprising: a base oriented in a substantially vertical direction or inclined, a plate placed opposite the base, a supply port for a dispersed phase formed in the base and a boundary section formed in the side opposite to the plate of the base for dividing the space into which the dispersed phase is supplied and the space into which the continuous phase is supplied, wherein a plurality of microchannels having a predetermined width are formed at a position from which microspheres can be withdrawn by floating and sinking in response to their specific gravity, and further wherein the dispersed phase comes into contact with the continuous phase via the microchannels.

It is possible to make the plate placed opposite the base transparent. As a result of this, it is possible to directly visually observe the motion of the dispersed phase in the microchannels and the contact condition of the dispersed phase with the continuous phase, and to control the production of microspheres based on such observations.

It is also possible to efficiently produce microspheres according to the present invention by providing a boundary section in which a plurality of microchannels are formed to surround the supply port of the dispersed phase.

For use in the apparatus of the invention, it is possible to form a plurality of microchannels having arbitrary form and a predetermined width in the base by adopting an etching process used in the process of forming integrated circuits for semiconductors as the method of forming the microchannels.

In general, as disclosed in International Publication No. WO97/30783, the microchannels may be formed by subjecting the base to an etching treatment, irradiation of electron rays, or a precision processing technique, such as a CVD method or the like.

DESCRIPTION DETAILED OF THE PREFERRED EMBODIMENTS

Embodiments of the present invention will now be described referring to the attached figures.

Figure 1:
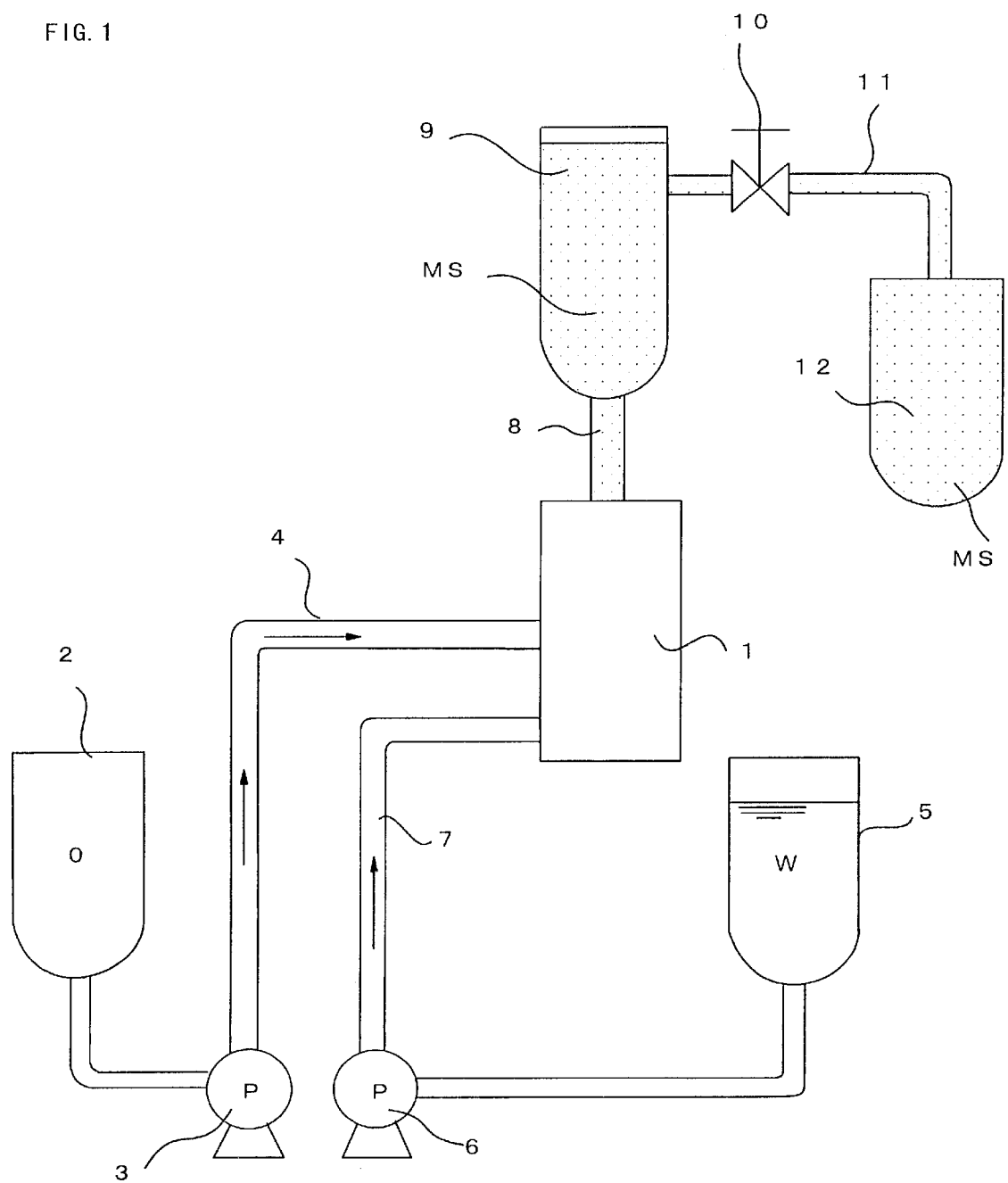
FIG. 1 is an overall view of the system in which an apparatus for manufacturing microspheres according to the present invention is installed.

As shown in FIG. 1, a dispersed phase (O) is supplied from a dispersed phase tank 2 to a manufacturing apparatus for microspheres 1 via a pump 3 and a pipe 4, and a continuous phase (W) is supplied from a continuous phase tank 5 to the manufacturing apparatus for 1 via a pump 6 and a pipe 7. Microspheres (MS) manufactured in the manufacturing apparatus for 1 are once retained in a header tank 9 after transfer through a pipe 8, and thereafter, are reserved in a microsphere tank 12 after transfer through a pipe 11 equipped with a valve 10.

In this embodiment, pumps are used as the means of pressurizing. However, it is also possible to use differences in water level and so on.

Next, the structure of the manufacturing apparatus for microspheres 1 will be explained referring to FIGS. 2–7. In this manufacturing apparatus 1, one opening of a body 20 which is transversely cylinder-shaped is closed with a lid 21, and an other opening thereof is closed with a plate 22. A supply port 23 for a dispersed phase to which the pipe 4 is connected is formed in the lid 21, and a supply port 24 for a continuous phase to which the pipe 7 is connected is also formed in the lid 21. By making the plate 22 transparent, i.e., by employing a glass plate or the like, it is possible to observe the production of microspheres with the naked eye, a camera, or the like as described later.

A base 25 is placed in the space inside of the body 20, which is formed between the lid 21 and the plate 22. The base 25 is oriented in a substantially vertical direction, and is flexibly pushed onto the side of the plate 22 via a bulkhead member 26 (employing a suitable o-ring and so on), which stands between the lid 21 and the base 25.

The bulkhead member 26 divides a chamber 27 for the dispersed phase, which connects with the supply port 23 for the dispersed phase, and a chamber 28 for the continuous phase, which connects with the supply port 24 for the continuous phase, in order to prevent liquid from escaping. A supply port 29 for the dispersed phase which connects with the chamber 27 for the dispersed phase is formed in the center part of the base 25, a bank-shaped or ridge-shaped boundary section 30 is formed at the side opposite to the plate 22 of the base 25 in order to rectangularly surround the supply port 29 for the dispersed phase, and a gap 31 is formed between the base 25 and the plate 22, wherein the gap 31 is equal to the height of the boundary section 30 in the case where the base 25 is pushed onto the side of the plate 22 by the bulkhead 26.

Figure 2:
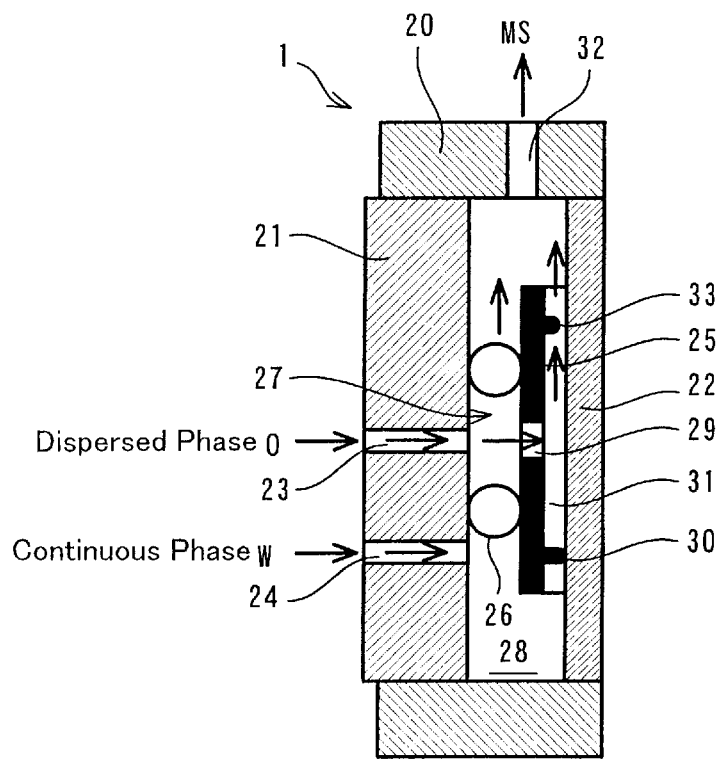
FIG. 2 is an elevational view in cross section of the microsphere manufacturing apparatus according to a first preferred embodiment of the present invention.
Figure 6:
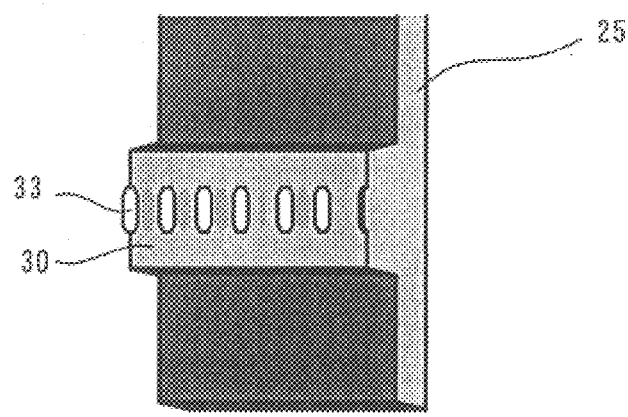
FIG. 6 is an enlarged perspective view of microchannels formed in a base.
Figure 7:
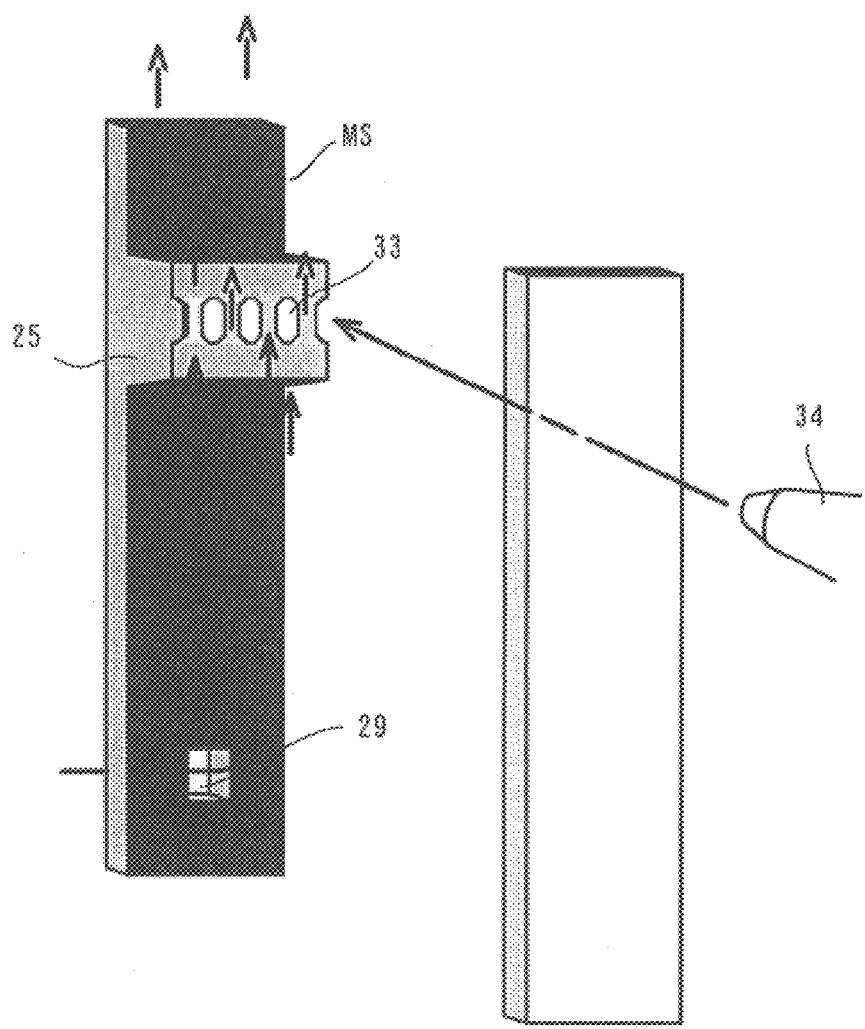
FIG. 7 is a perspective view illustrative of situation where microspheres are produced from microchannels.

The manufacturing apparatus for microspheres 1 shown in FIG. 2 is applied in the case where the specific gravity of the microspheres produced therein is smaller than that of the continuous phase. In this manufacturing apparatus 1, a withdrawal port 32 for microspheres which is connected with the pipe 8 is formed in the top of the body 20, and a microchannel 33 is formed in a surface of the boundary section which forms the upper side of the boundary section 30 as also shown in FIG. 6.

As a preferred method of forming the boundary section 30 including the microchannel 33, the wet or dry etching process is adopted.

In the above case, a dispersed phase (O) is supplied to the chamber 27 for the dispersed phase inside of the bulkhead member 26 via the supply port 23, and thereafter, the dispersed phase enters into the gap 31 between the plate 22 and base 25 via the supply port 29 in the base 25. The, dispersed phase, which enters into the gap 31, grows particles having a certain diameter while passing through the microchannel 33 due to pressure applied by a means of pressurizing (e.g. a pump) and is mixed with the continuous phase (W), so that microspheres are produced.

The thus-produced microspheres float or are suspended in the continuous phase without the necessity for any external force in response to their specific gravity, i.e., in the case where their specific gravity is smaller than that of the continuous phase, as shown in FIG. 2, so that the microspheres can be withdrawn from the withdrawal port 32. It is possible to observe this situation with a camera 34 (see FIG. 7) and so on.

Figure 3:
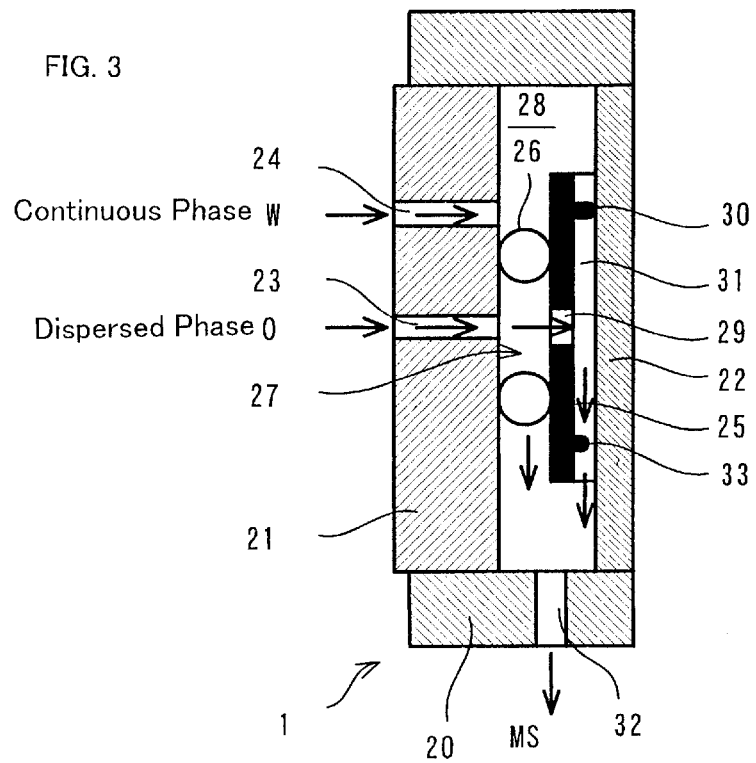
FIG. 3 is an elevational view of cross section of a manufacturing apparatus according to another preferred embodiment of the invention.
Figure 4:
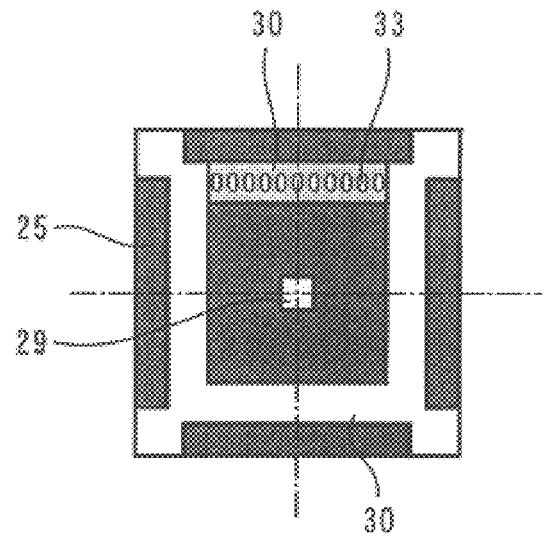
FIG. 4 is a front elevational view of a base to be installed in a microsphere manufacturing apparatus according to the invention.
Figure 5:
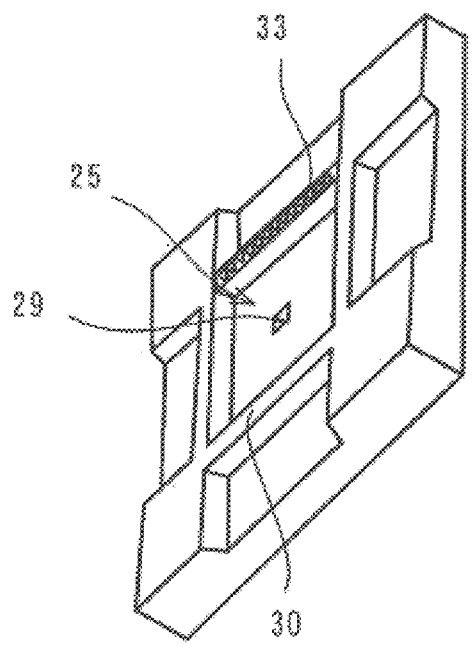
FIG. 5 is a perspective view of the base.

On the other hand, in the case where the specific gravity of the produced microspheres is larger than that of the continuous phase, as shown in FIG. 3 the manufacturing apparatus 1 is turned 180° from its disposition in FIG. 2, and the microspheres sink and are withdrawn via the microchannel 33 formed in the lower side of the boundary section 30 and the withdrawal port 32 formed in the bottom of the body.

In the preferred embodiment embodiment shown in figures, the base is oriented in a vertical direction. However, the base may be oriented at an inclination. In other words, a structure in which the microspheres travel by themselves in response to their specific gravity is required. As a base, it is possible to form a porous glass plate in a certain orientation to utilize the autonomous floating and sinking of the microspheres.

Preferred embodiments of a microsphere manufacturing method according to the present invention will be described below.

(Embodiment)

Triolein including sorbitanmonolaurate 0.3% by weight was used as the dispersed phase, water was used as the continuous phase, the driving pressure was set at 1.08 kPa, 1.26 kPa, 1.35 kPa, or 2.44 kPa, and the manufacture of microspheres was tried. The results of this is shown in FIGS. 8–11.

Figure 8:
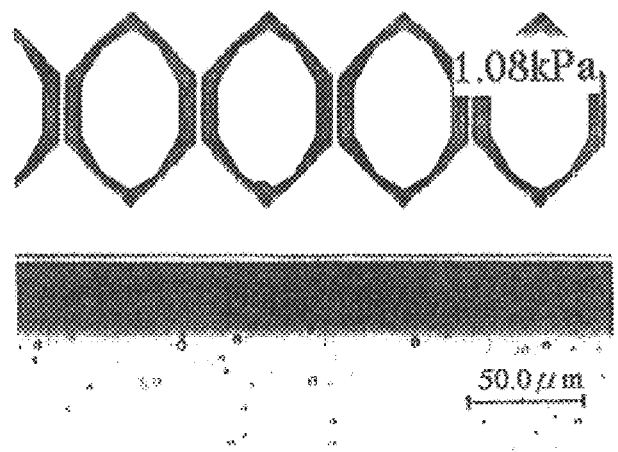
FIG. 8(a) is a photomicrograph of microchannels in a case where a driving pressure is set at 1.08 kPa
FIG. 8(b) is a diagram illustrative of FIG. 8(a)
Figure 8:
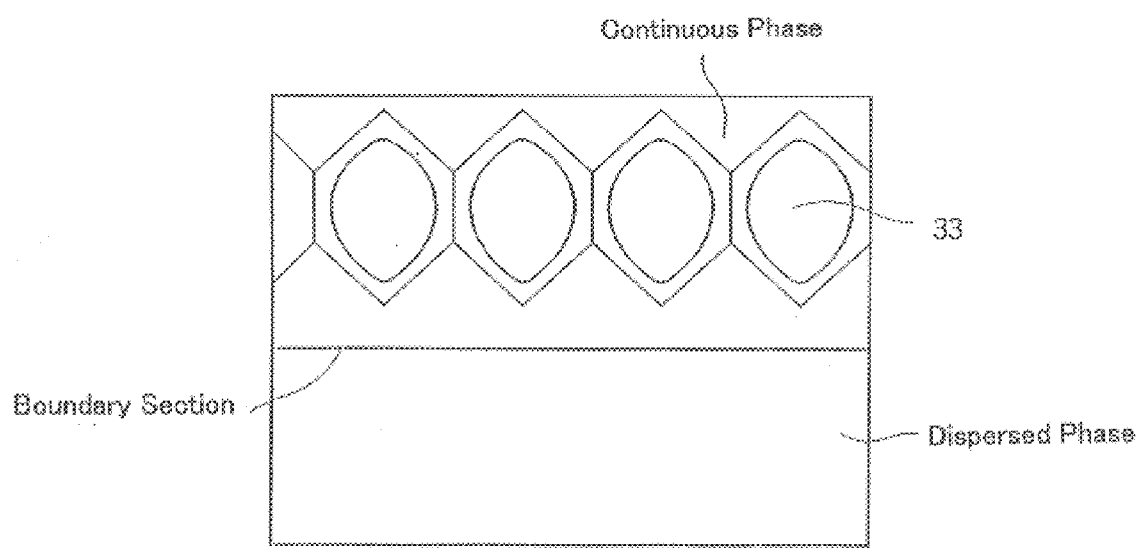
Figure 9:
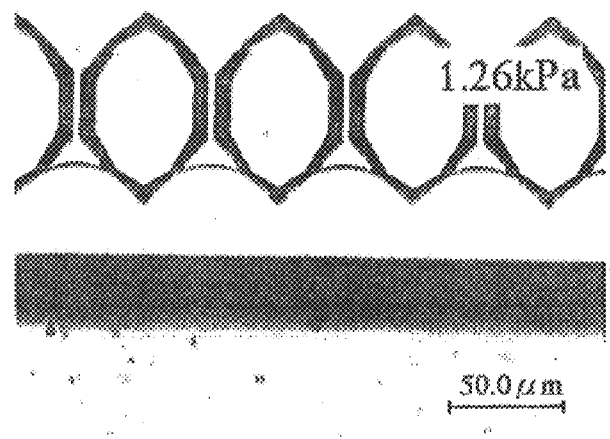
FIG. 9(a) is a photomicrograph of microchannels in a case where the driving pressure is set at 1.26 kPa
FIG. 9(b) is a diagram illustrative of FIG. 9(a)
Figure 9:
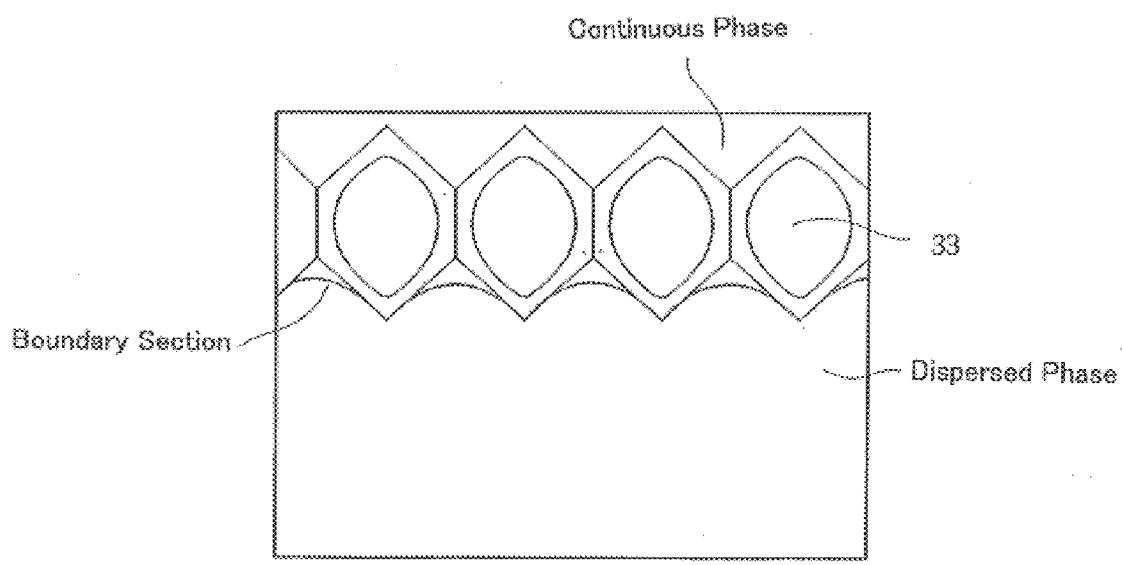
Figure 10:
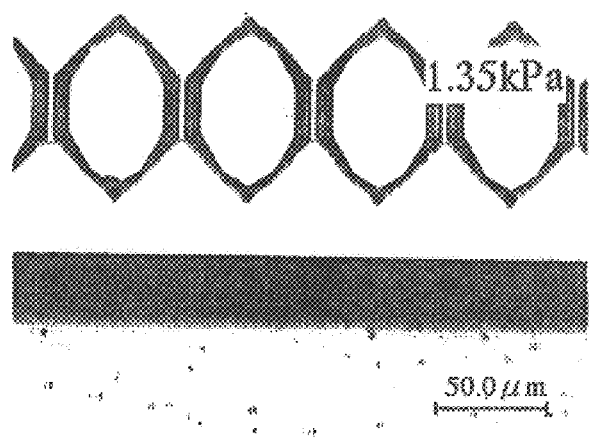
FIG. 10(a) is a photomicrograph of microchannels in a case where driving pressure is set at 1.35 kPa
FIG. 10(b) is a diagram illustrative of FIG. 10(a)
Figure 10:
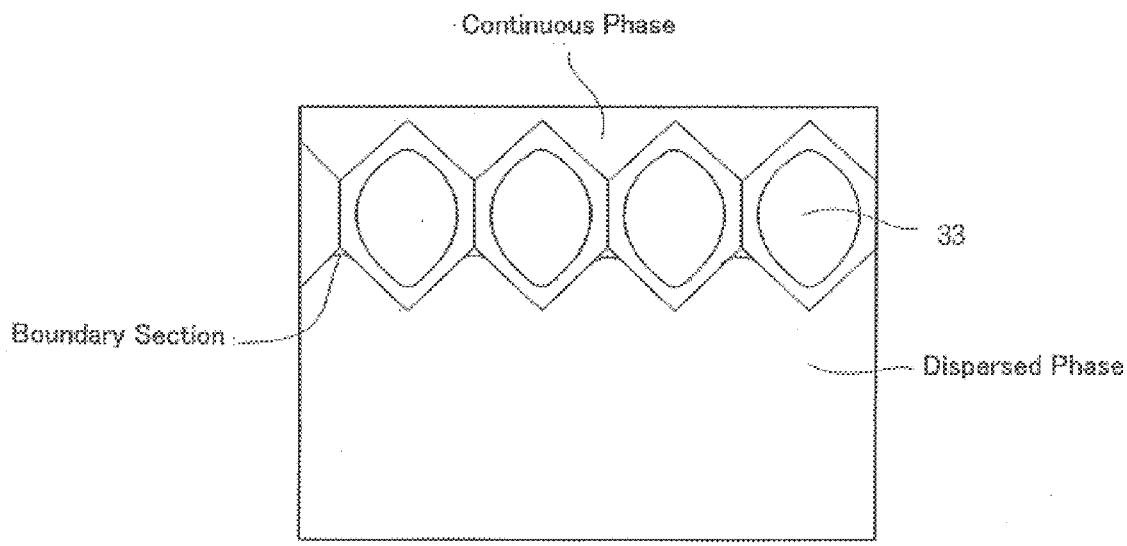
Figure 11:
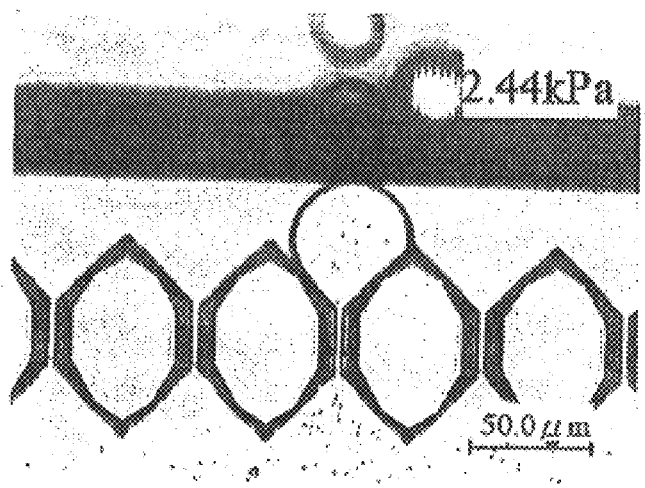
FIG. 11(a) is a photomicrograph of microchannels in a case where the driving pressure is set at 2.44 kPa
FIG. 11(b) is a diagram illustrative of FIG. 11(a)
Figure 11:
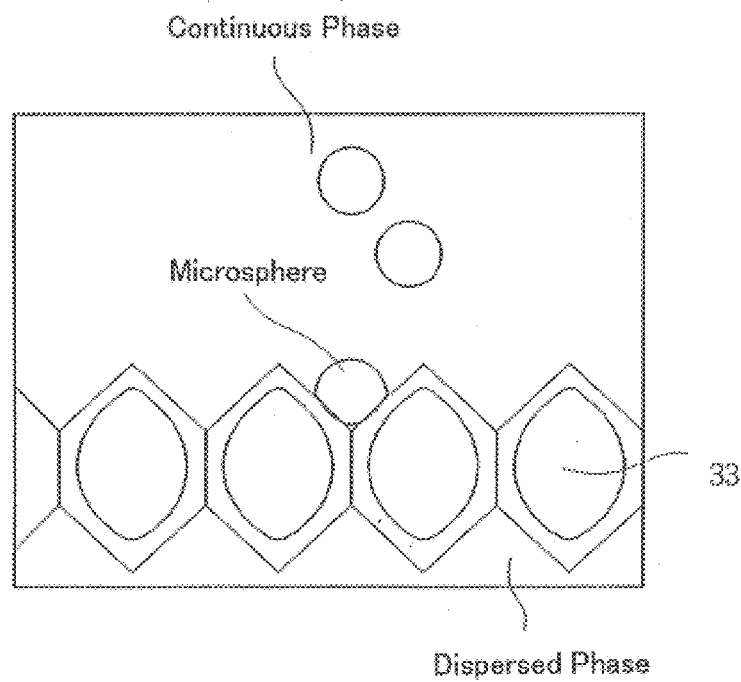

As shown in FIGS. 8–10, if the driving pressure is set at a small value (1.08–1.35 kPa), the dispersed phase cannot be pumped into the continuous phase, and therefore, microspheres cannot be obtained. However, as shown in FIG. 11, if the driving pressure is raised to 2.44 kPa, the dispersed phase can be pumped into the continuous phase via the microchannels, thus forming microspheres.

Figure 14:
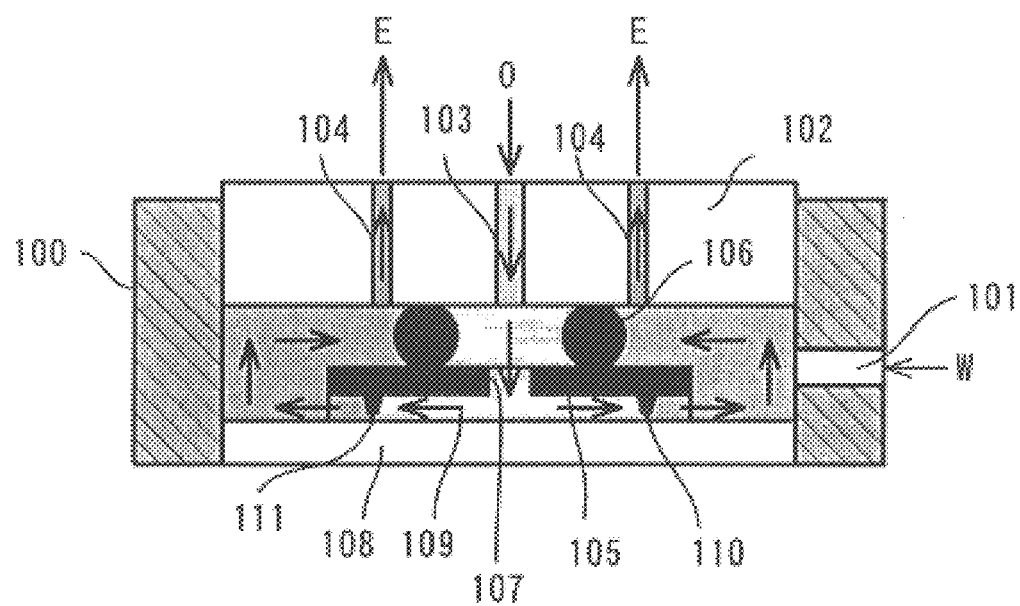
FIG. 14 is a cross-sectional view of the apparatus which the inventors of the present invention formerly proposed.

In regard to the apparatus of FIG. 14, which the inventors of the present invention formerly proposed (disclosed in International Publication No. WO97/30783), it is disclosed that microspheres (emulsions) cannot be obtained before the driving pressure is raised to 8.38 kPa. As will be understood, the apparatus according to the present invention is sharply improved in comparison with the formerly proposed apparatus because a much smaller driving pressure can be used to form microspheres.

Figure 12:
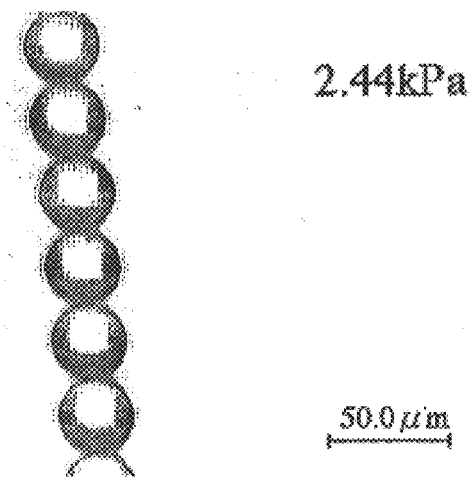
FIG. 12(a) is, a photomicrograph which shows the situation where microspheres travel in a continuous phase in response to their specific gravity
FIG. 12(b) is a diagram illustrative of FIG. 12(a)
Figure 12:
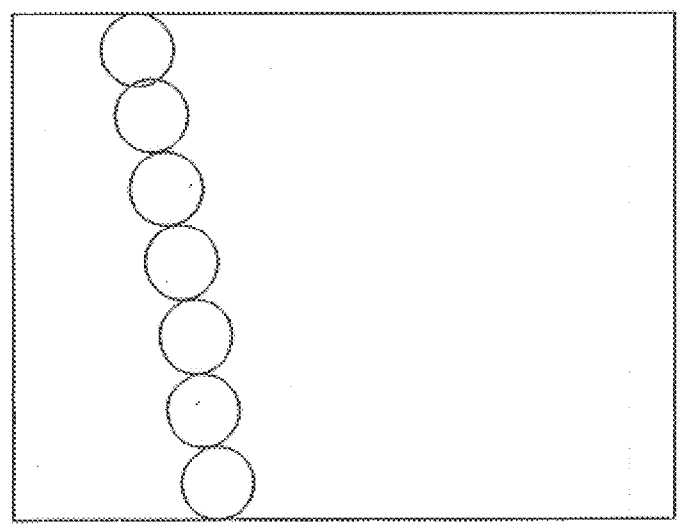
Figure 13:
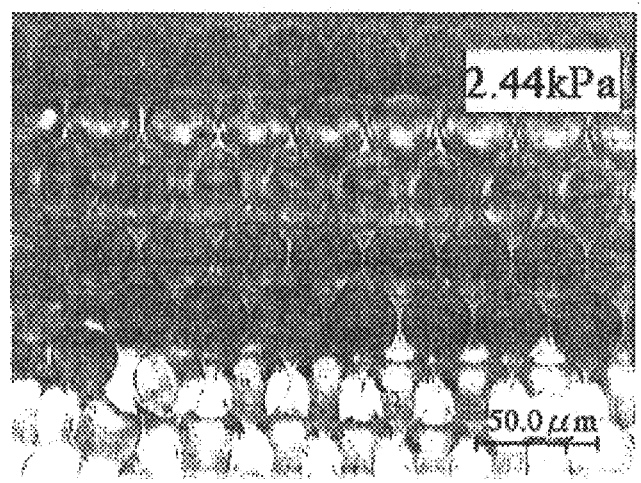
FIG. 13(a) is a photomicrograph of microspheres obtained by the present invention and FIG. 13(b) is a diagram illustrative of FIG. 13(a)
Figure 13:
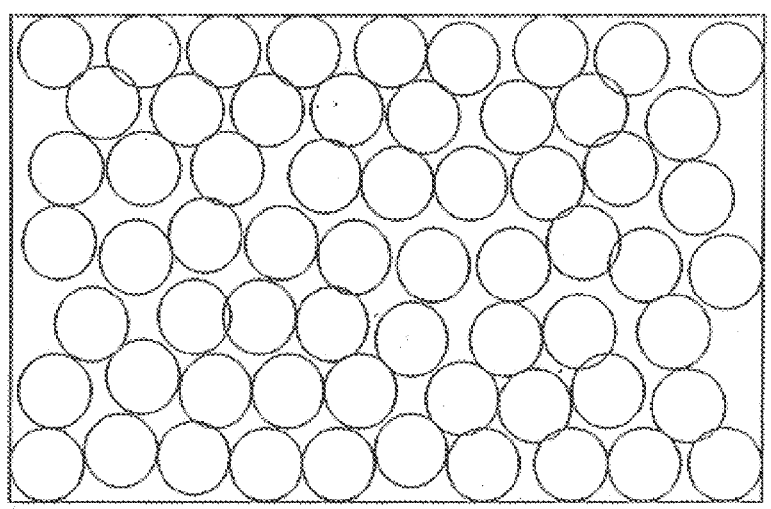

In addition, as shown in FIGS. 12(a) and 12(b), the dispersed phase particles pumped into the continuous phase via the microchannels float (or sink) in response to their specific gravity while forming a line, and thus, as shown in FIGS. 13(a) and 13(b), homogenous microspheres having a certain diameter can be withdrawn from the manufacturing apparatus.

As described above, according to the manufacturing method of the present invention, a pressurized dispersed phase is transferred into a continuous phase by force via a plurality of microchannels having a predetermined width formed in a base and so on, and the thus-produced microspheres are withdrawn due to their floating and sinking in the continuous phase in response to their specific gravity. As a result of this, microspheres having a certain diameter can be continuously manufactured not only in a case where the diameters of the dispersed phase particles are small but also in a case where the diameters of the dispersed phase particles are large.

Also, according to the manufacturing apparatus of the present invention, a base oriented in a vertical direction or inclined is formed in an apparatus body, a plate is disposed opposite to the base, a supply port for the dispersed phase is formed in the base, and a boundary section is formed on the side of the base opposite to the plate for dividing the space into which the dispersed phase is supplied and the space into which the continuous phase is supplied. A plurality of microchannels having a predetermined width are provided in a position from which microspheres can be withdrawn due to their own floating and sinking in response to their specific gravity and the dispersed phase comes into contact with the continuous phase via the microchannels. As a result of this, particle diameters are distributed in a narrow range and thus homogenous microspheres can be continuously and efficiently manufactured.

In particular, it is possible to continuously withdraw the thus-produced microspheres without necessity for any particular external force by providing a boundary section between the dispersed phase and the continuous phase to surround a supply port for the dispersed phase and by forming microchannels in a certain direction of the boundary section to utilize the floating and sinking of the microspheres in response to their specific gravity.

It is possible to produce microspheres without increasing the pressure of pumping the dispersed phase because the difference in pressure between the inside and the outside of the microchannels increases due to the floating and sinking of the microspheres.

Although there have been described what are at present considered to be the preferred embodiments of the invention, it will be understood by those in the art that variations and modifications may be made thereto without departing form the gist or essence of the invention. The scope of the invention is indicated by the appended claims, rather than by the foregoing description.

What is claimed is:

1. A method for continuously manufacturing microspheres, comprising the steps of:
   forcing a pressurized dispersed phase into a continuous phase via a plurality of microchannels having a predetermined width to produce microspheres in the form of emulsions and fine particles suspended in liquid; and
   withdrawing said microspheres according to floating and sinking of said microspheres in response to their specific gravity.

2. The method according to claim 1, wherein said dispersed phase is forced through said microchannels in a one direction, and said microspheres are withdrawn in said one direction after said floating and sinking of said microspheres in response to their specific gravity.

3. The method according to claim 1, wherein said microspheres are withdrawn downwardly when their specific gravity is greater than that of said continuous phase.

4. The method according to claim 1, wherein said microspheres are withdrawn upwardly when their specific gravity is less than that of said continuous phase.

5. The method according to claim 1, wherein said microchannels are defined in a base and are formed by subjecting the base to one of an etching treatment, irradiation of electron rays, and a CVD method.

6. An apparatus for continuously manufacturing microspheres, comprising:
a base oriented in a substantially vertical direction;
a plate based opposite the base;
a supply port for a dispersed phase formed in the base; and
a boundary section formed on a side of the base opposite to the plate for dividing a space into which the dispersed phase is supplied and a space into which a continuous phase is supplied; wherein
a plurality of microchannels having a predetermined width are provided in said boundary section at a position wherein the dispersed phase comes into contact with the continuous phase via the microchannels to form microspheres and from which said microspheres can be withdrawn due to floating and sinking thereof in response to their specific gravity.

7. The manufacturing apparatus defined in claim 6, wherein said plate placed opposite the base is transparent.

8. The manufacturing apparatus for microspheres defined in claim 7, wherein said microchannels are formed by subjecting the base to one of an etching treatment, irradiation of electron rays, and a CVD method.

9. The manufacturing apparatus defined in claim 6, wherein said boundary section surrounds the supply port for the dispersed phase.

10. The manufacturing apparatus for microspheres defined in claim 9, wherein said microchannels are formed by subjecting the base to one of an etching treatment, irradiation of electron rays, and a CVD method.

11. The manufacturing apparatus for microspheres defined in claim 6, wherein said microchannels are formed by subjecting the base to one of an etching treatment, irradiation of electron rays, and a CVD method.

12. The manufacturing apparatus for microspheres defined in claim 6, further including a withdrawal port through which said microspheres are withdrawn, an axis of said withdrawal port extending in a direction which is the same as that in which said microspheres pass through said microchannels.

13. The manufacturing apparatus for microspheres defined in claim 12, wherein said space into which said continuous phase is supplied includes a portion defined between said microchannels and said withdrawal port.

14. The manufacturing apparatus for microspheres defined in claim 12, wherein said withdrawal port is disposed below said microchannels when the apparatus is to be used to manufacture microspheres having a specific gravity greater than that of said continuous phase.

15. The manufacturing apparatus for microspheres defined in claim 12, wherein said withdrawal port is disposed above said microchannels when the apparatus is to be used to manufacture microspheres having a specific gravity less than that of said continuous phase.

* * * * *

UNITED STATES PATENT AND TRADEMARK OFFICE
CERTIFICATE OF CORRECTION

PATENT NO. : 6,177,479 B1
DATED : January 23, 2001
INVENTOR(S) : Nakajima et al.

It is certified that error appears in the above-identified patent and that said Letters Patent is hereby corrected as shown below:

Title page,
In the title "(54)", after "APPARATUS" insert -- THEREFOR --.

Column 1,
Between the title and the "BACKGROUND OF THE INVENTION" line, insert the following paragraph:

-- This document contains at least one drawing executed in color. Copies will be provided by US Patent & Trademark Office on request upon payment of necessary fees. --; line numbered between 31 and 32, after "and" delete the comma.

Column 2,
Line numbered between 17 and 18, change "W)97/30783" to -- WO97/30783 --.

Column 3,
Line 36, change "view of" to -- view in --;
Line 37, before "manufacturing" insert -- microsphere --;
Line 46, after "of" insert -- a --;
Line 61, delete the comma.

Column 4,
Line 3, change "DESCRIPTION DETAILED" to -- DETAILED DESCRIPTION --;
Line numbered between 11 and 12, change "for 1" to -- 1 --;
Line numbered between 13 and 14, change "for 1" to -- 1 --.

Column 5,
Line 36, change "Triolein" to -- Triorein --;
Line numbered between 40 and 41, change "tried" to -- attempted --; change "is" to -- are --.

UNITED STATES PATENT AND TRADEMARK OFFICE
CERTIFICATE OF CORRECTION

PATENT NO. : 6,177,479 B1
DATED : January 23, 2001
INVENTOR(S) : Nakajima et al.

It is certified that error appears in the above-identified patent and that said Letters Patent is hereby corrected as shown below:

<u>Column 6,</u>
Line 44, change "form" to -- form --.

Signed and Sealed this

Twenty-third Day of October, 2001

Attest:

*Attesting Officer*

NICHOLAS P. GODICI
*Acting Director of the United States Patent and Trademark Office*